UNITED STATES PATENT OFFICE.

FRANCIS ALPHA COTHIAS, OF IVRY-PORT, FRANCE.

ALLOY.

SPECIFICATION forming part of Reissued Letters Patent No. 11,660, dated April 19, 1898.

Original No. 586,094, dated July 13, 1897. Application for reissue filed January 11, 1898. Serial No. 666,375. Patented in France June 2, 1896, No. 256,852; in Belgium June 30, 1896, No. 122,223; in England June 30, 1896, No. 14,479; in Austria July 31, 1896, No. 46/3,442; in Italy July 31, 1896, No. 42,221; in Luxemburg July 31, 1896, No. 2,582, and in Spain July 31, 1896, No. 19,417.

*To all whom it may concern:*

Be it known that I, FRANCIS ALPHA COTHIAS, a citizen of the Republic of France, residing at 9 Rue Victor Hugo, Ivry-Port, Seine, in the Republic of France, have invented certain new and useful Improvements in Alloys, of which the following is a full, clear, and exact specification.

The invention has been patented in France, No. 256,852, dated June 2, 1896; in Belgium, No. 122,223, dated June 30, 1896; in Austria, No. 46/3,442, dated July 31, 1896; in Italy, No. 42,221, dated July 31, 1896; in Luxemburg, No. 2,582, dated July 31, 1896; in England, No. 14,479, dated June 30, 1896, and in Spain, No. 19,417, dated July 31, 1896.

The invention forming the subject of this application relates to a new metallic alloy and process of making the same. This alloy has considerable tensile strength. Its resisting force is as high as thirty-five kilograms per square millimeter of section. It can be soldered and worked with the greatest ease. It consists of a mixture in given proportions of copper, tin, zinc, and aluminium, to which I add chlorid of ammonia and phosphorus in the state of salt.

The composition of this alloy is as follows: copper, eighty grams; tin, one hundred and ninety grams; zinc, five hundred grams, aluminium, two hundred and thirty grams; total, one thousand grams. An alloy in these proportions and prepared in the manner hereinafter described, with additions of chlorid of ammonia and phosphides, is especially suitable for casting light pieces of machinery which must have considerable resisting force. It enables one to obtain pieces of this kind completely finished on leaving the mold.

For manufacturing this alloy I proceed in the following manner: I begin by putting into a crucible the requisite quantities of copper and tin and I let them melt together. In this way I obtain a first alloy of copper and tin, to which, after cooling, I add the necessary quantity of zinc. Then I let the whole mass melt together once more. When the mass is completely molten, I let it cool down until it becomes pasty. I then add the requisite proportions of aluminium, which immediately heightens the temperature of the mass, and, finally, I heat the mass to a very high temperature. The substances are thereby combined in the most complete manner and I obtain a perfectly homogeneous alloy.

In order to facilitate the combination of the various elements and reduce the oxids that will form at every melting, I add during the last manipulation about a kilogram of chlorid of ammonia per one thousand kilograms of alloy. I add also during the last manipulation a small quantity of phosphorus in order to give to the alloy an easier flow and greater fluidity. This phosphorus can be used in the state of salt. These salts are phosphides of titanium, manganese, wolfram, tungsten, &c., which further increase the hardness of the alloy. When the alloy is completely melted, it is cast into ingot-molds, wherein it is left to cool.

To make perfectly sure that the composition of the alloy is correct, a sample is taken and analyzed, and if it is found that the required proportions do not exist the alloy is melted over again and such material added as is necessary to give to the mass the requisite composition.

The various metals used to increase the resisting force and hardness of alloys (titanium, manganese, wolfram, tungsten, &c.) are added to the mixture in the state of salts (chiefly in the state of phosphides) either during the last melting or during the remelting of the ingot performed after the first casting and the taking of the samples. The alloy obtained in the way described above is fusible at a temperature below 800° centigrade. It is sufficient to heat it in kettles in the open air, exactly like lead or tin, and neither furnaces nor crucibles are required.

This alloy molds itself perfectly in metal molds.

I claim—

1. The alloy described consisting of copper, eighty parts, tin one hundred and ninety parts, zinc five hundred parts and aluminium two hundred and thirty parts.

2. The process described, consisting in melting together copper and tin and cooling, adding thereto zinc and then remelting, allowing the mass to cool to a pasty composition, then adding aluminium and finally heating the mass to a high temperature, substantially as described.

In witness whereof I have hereunto set my hand in presence of two witnesses.

FRANCIS ALPHA COTIIIAS.

Witnesses:

ANDRÉ MESTICH,

VICTOR PEMMETZ.